United States Patent [19]

Greenslade

[11] Patent Number: 5,020,230
[45] Date of Patent: Jun. 4, 1991

[54] INTERNAL THREAD GAGE

[76] Inventor: Joe E. Greenslade, P.O. Box 330865, Fort Worth, Tex. 76063

[21] Appl. No.: 550,445

[22] Filed: Jul. 10, 1990

[51] Int. Cl.⁵ .............................................. G01B 3/48
[52] U.S. Cl. ................................................ 33/199 R
[58] Field of Search .................. 33/829, 199 R, 199 B

[56] References Cited

U.S. PATENT DOCUMENTS

| | | | |
|---|---|---|---|
| 734,784 | 7/1903 | Wells | 33/829 |
| 2,509,886 | 5/1950 | Sachtleber | 33/199 R X |
| 2,578,261 | 12/1951 | Orr . | |
| 2,706,859 | 4/1955 | Johnson . | |
| 2,799,090 | 7/1957 | Grzywna et al. | 33/199 R |
| 2,822,624 | 2/1958 | Klink | 33/199 B |
| 2,842,861 | 7/1958 | Johnson . | |

OTHER PUBLICATIONS

The Johnson Gage Company, Internal Thread Gaging System, Bloomfield, Conn., 06002, 10 pages.
The Mtg. System of Internal & External Gaging, Aug. 6, 1938, 5100 Grumann Drive, Carson City, Nev., 89706 (702)883-1000.
PD System (Pitch Diameter Thread Measurement), Gagemaker Measuring Systems, 14 pages, P.O. Box 46452, Houston, Tex., 77234, (713)472-7360.

Primary Examiner—Harry N. Haroian
Attorney, Agent, or Firm—James E. Bradley

[57] ABSTRACT

An internal thread gage has two gage fingers mounted perpendicular to a frame axis. Each gage finger has a semi-cylindrical surface cut with helical threads. The gage fingers will move together and expand apart to allow an internally threaded fastener to be inserted over them for measurement. One of the gage fingers will move perpendicular to the frame axis to assure that the threads on the gage fingers properly mesh with the internal threads of the fastener. The gage fingers have threads for forming functional diameter measurement, as well as a cone and vee for making pitch diameter measurement.

12 Claims, 2 Drawing Sheets

INTERNAL THREAD GAGE

BACKGROUND OF THE INVENTION

1. Field of the Invention

This invention relates in general to devices for measuring threads of fasteners, and in particular to a device for measuring internal threads of fasteners.

2. Description of the Prior Art

It is important in many industries to assure that internally threaded fasteners, such as nuts, have the proper thread dimensions. Internal thread gages have been used to measure the functional and pitch diameters of the threads. Pitch diameter is the diameter of an imaginary cylinder, the surface of which would pass through the thread profiles at such points as to make the width of the thread groove (measured parallel to the axis) equal to one-half of the basic pitch. Functional diameter is the pitch diameter of an enveloping thread with perfect pitch, lead, and flank angles and having a specified length of engagement. This diameter includes the cumulative effect of variations in lead (pitch), flank angle, taper, straightness, and roundness. Variations at the thread crest and root are excluded. Many specifications require that both of these measurements be made.

A typical internal thread gage has a frame with two mounting blocks. One of the mounting blocks will move along the frame axis relative to the other. A gage finger will mount to each mounting block. If the gage finger is of a type for measuring functional diameter, it will have a plurality of semi-cylindrical threads. These mate with threads formed on the other gage finger.

By moving the movable mounting block, the diameter of the two gage fingers can be constricted. This allows the user to insert a nut over the threads. The user then allows the movable mounting block to move in the opposite direction, normally urged by springs. The threads of the gage fingers will engage the threads of the fastener. A meter measures the amount of travel of the movable block from a zero position to provide a reading of the functional diameter.

One problem With this type of gage is that the threads of the gage fingers may not fully mesh with the threads of the fastener. The two gage fingers are formed by carefully machining threads on a single shaft, then cutting the shaft in half along the axis of the shaft. The helical path of the threads of the two halves will match only when the gage fingers are positioned precisely at the original dimension of the shaft. This dimension may not be precisely the dimensions of the fasteners being measured. Mismatch of the helical path will result in the gage fingers not fully meshing their threads with that of the fastener. This may be undetected by the user and result in an erroneous reading.

Another problem with prior art techniques is in having to measure both functional diameter and pitch diameter. Pitch diameter must be measured by gage fingers that have only a single thread or protuberance, called a "cone", on one gage finger. The other gage finger will have only two threads or protuberances, called a "vee". The cone and vee are formed on separate gage fingers from the gage fingers that have functional diameter threads. Consequently, the user must have a separate frame and meter for pitch diameter measurements, or he must mount and remove the two different types of gage fingers from a single frame.

SUMMARY OF THE INVENTION

In this invention, one of the gage fingers is mounted to one of the mounting blocks in a manner such that it can slide perpendicular to the frame axis. This sliding movement, along the gage finger axis, enables the fingers to fully mesh into the fastener threads by aligning the helixes of the two gage fingers. Preferably, this mounting means comprises a slidable member located between one of the gage fingers and one of the mounting blocks.

Also, to enable both pitch and functional diameter measurement to be made, each gage finger has both types of threads formed in them. One of these threads will be a set of functional diameter threads. The other will be a cone or vee. The operator can make these measurements with a single instrument, using only a single set of gage fingers.

BRIEF DESCRIPTION OF THE DRAWINGS

FIG. 3 is an enlarged sectional view of a portion of an alternate embodiment of thread gage constructed in accordance with this invention.

DETAILED DESCRIPTION OF THE INVENTION

Figure 1:
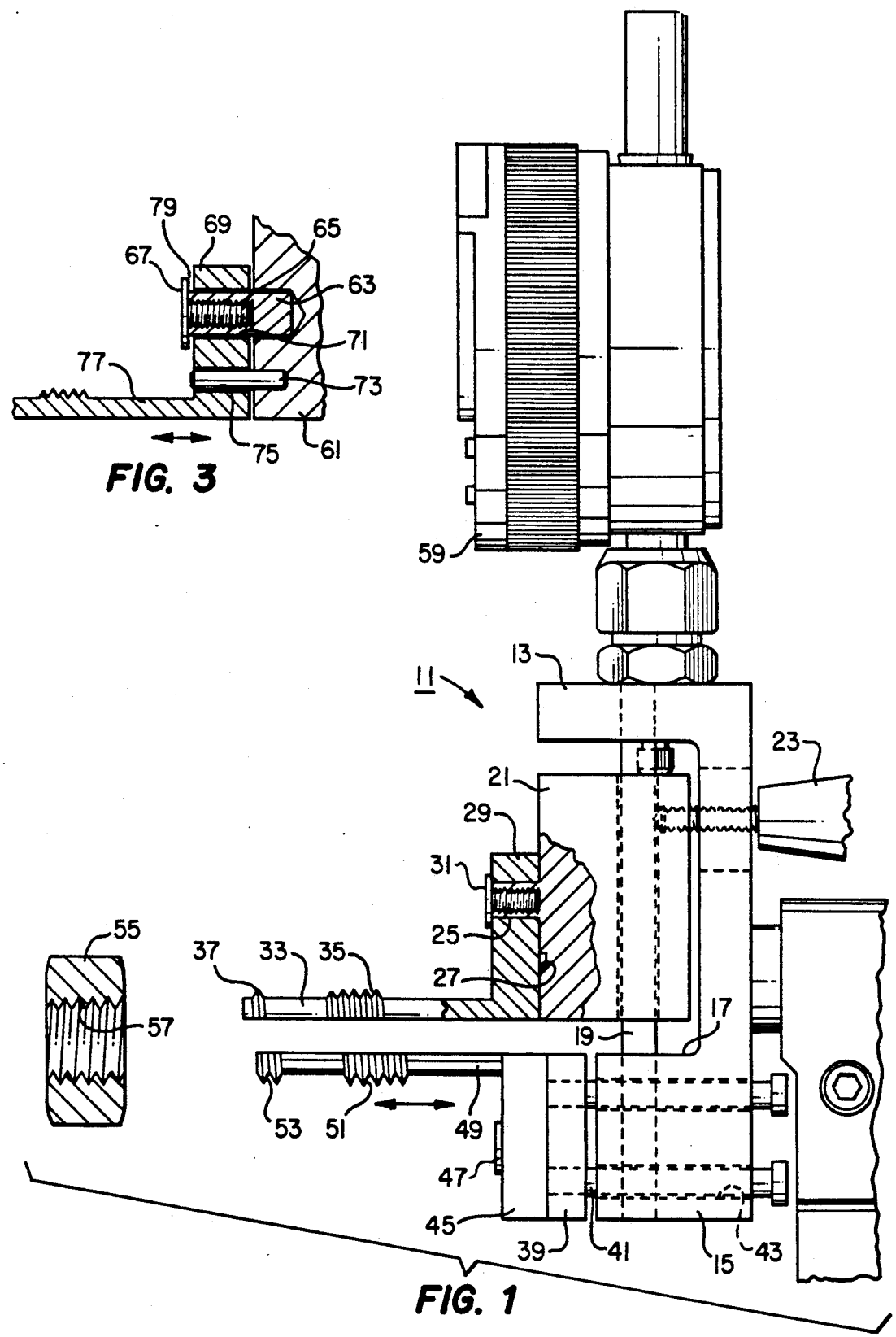
FIG. 1 is a side view, partially in section, illustrating a thread gage constructed in accordance with this invention.

Referring to FIG. 1, thread gage 11 has a frame 13. Frame 13 has a longitudinal axis that is shown a in FIG. 1. Frame 13 has on its lower end a stationary mounting block 15, which is integrally formed with frame 13. A cavity 17 extends between an upper portion of frame 13 and the top of the stationary mounting block 15. A pair of cylindrical rods 19 (only one shown) extend from the upper portion of frame 13 through the stationary mounting block 15. Rods 19 are rigidly connected to the frame 13 and are parallel to the longitudinal axis of frame 13.

A movable mounting block 21 mounts slidably to the rods 19. Movable mounting block 21 has a pair of holes, each for receiving one of the rods 19. Springs (not shown) urge the mounting block 21 upward relative to the stationary mounting block 15. The movable mounting block 21 will move between an upper position, shown in FIG. 1, to a lower position with its bottom contacting the top of the stationary mounting block 15. A handle 23 protrudes from the rearward side of frame 13 and is secured to the movable mounting block 21.

Movable mounting block 21 has a socket 25 protruding from its forward side or face. Socket 25 is integrally formed with movable mounting block 21. Socket 25 comprises a cylinder, having an internally threaded bore and smooth cylindrical sidewalls. The movable mounting block 21 also has an alignment hole 27 located slightly below the socket 25.

Figure 2:
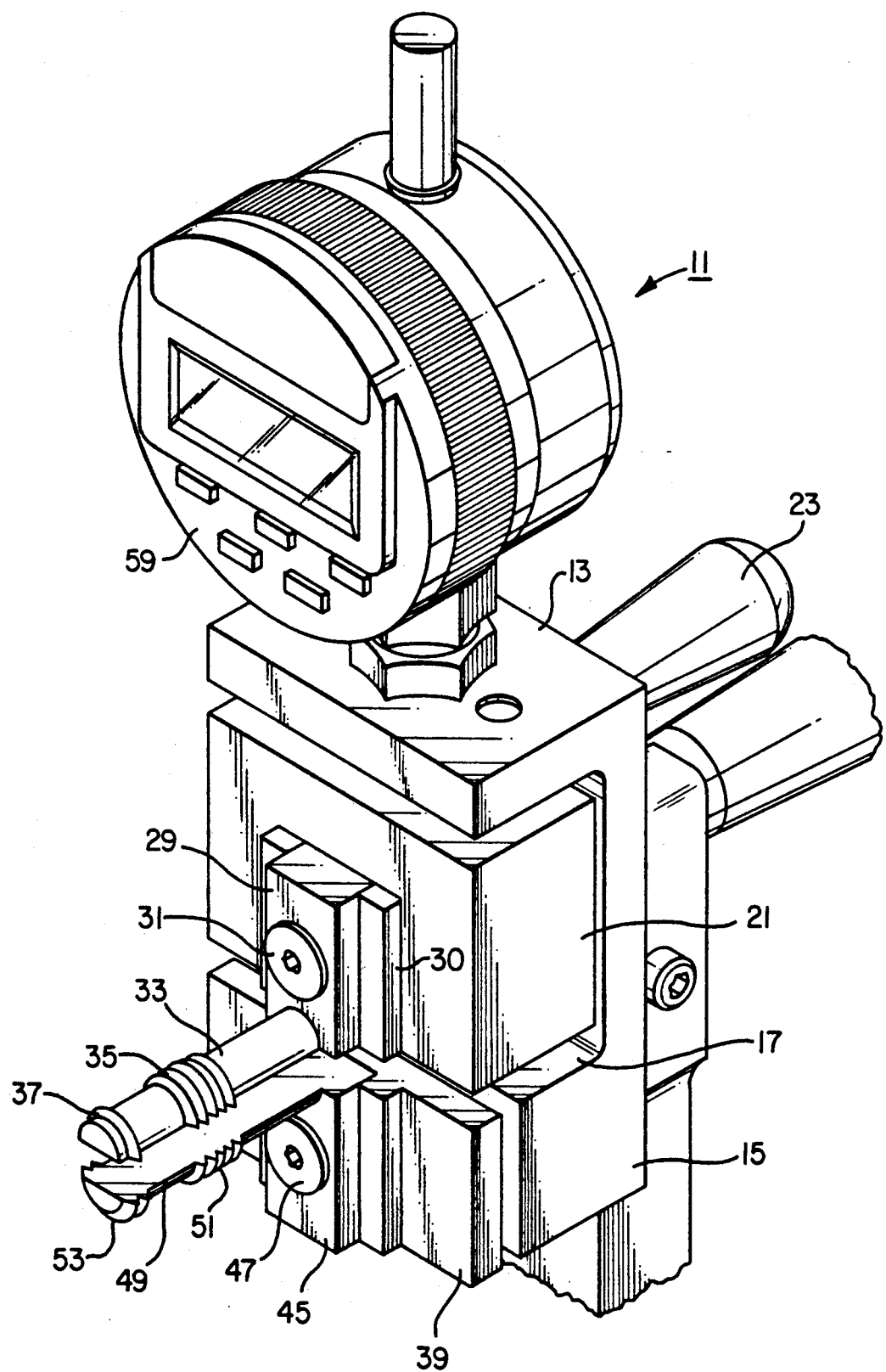
FIG. 2 is a perspective view of a portion of thread gage of FIG. 1.

A finger bracket 29 attaches to the movable mounting block 21. Finger bracket 29 is a flat plate that locates between alignment bars 30 (FIG. 2) on the face of the movable mounting block 21. A screw 31 with a head larger than socket 25 engages the threads of the socket 25. Screw 31 will secure the finger bracket 29 to the face of the movable mounting block 21. The finger bracket 29 has a pin that will insert into the alignment hole 27. The head of screw 31 will bear against the finger bracket 29 to rigidly mount the finger bracket 29 to the mounting block 21.

Finger bracket 29 supports a gage finger 33, which is integrally formed with finger bracket 29. Gage finger 33 is a semi-cylindrical member that protrudes outward perpendicular to the longitudinal axis of frame 13. Gage finger 33 has a free outer end and a set of threads 35 located between the outer end and the finger bracket 29. Threads 35 will be conventional, parallel, helical threads formed for functional diameter gaging. There are more than two threads within the set of threads 35.

A cone 37 is formed on the free or outer end of the gage finger 33. Cone 37 is a single thread, presenting a cone or triangular shape when view in cross-section. A smooth cylindrical space exists between the functional diameter threads 35 and the cone 37. The cone 37 is of the same shape and size as the threads 35, however it is only a single thread.

In the embodiment of FIG. 1, a mounting plate 39 slidably mounts to the stationary mounting block 15. Mounting plate 39 is a metal plate that has two pins 41 secured to it. Pins 41 extend through and will slide within holes 43 in the stationary mounting block 15. This allows the mounting plate 39 to move along a line that is perpendicular to the longitudinal axis of frame 13.

A finger bracket 45 mounts rigidly to the mounting plate 39 by a screw 47. Finger bracket 45 is identical to finger bracket 29 and mounts in the same manner as finger bracket 29. A gage finger 49 protrudes outward from finger bracket 45 along a line perpendicular to the axis of frame 13. Gage finger 49 will be spaced slightly below and in alignment with gage finger 33. This positioning defines a finger axis between them which is perpendicular to the longitudinal axis of frame 13. Gage finger 49 has a set of threads 51 located between its outer end and finger bracket 45. Threads 51 mate with the threads 35 of gage finger 33. Gage finger 49 also has a vee 53 located on its outer end. Vee 53 mates with the cone 37. Vee 53 comprises two threads formed at the same shape, size and pitch as the threads 51.

To manufacture the finger brackets 29, 45 and gage fingers 33, 49, a cylindrical shaft will be formed on a single plate. The operator cuts the cone and vee 37, 53 on the shaft at the same time. The operator cuts the threads 35, 51 on the shaft at the same time. The cone and vee 37, 53 will be a continuous helical thread. The threads 35, 51 will be a continuous helical thread. The finger brackets 29, 45 will be joined as a single bracket.

The operator then cuts the single part along the finger axis. This results in the two separate gage fingers 33, 49 and the two separate finger brackets 29, 45. The separate gage fingers 33, 49 will then be machined so that when the gage fingers 33, 49 are constricted into contact with each other, the maximum dimension from thread 35 to thread 51 will be about one-half the diameter of a fastener 55 for measurement.

The gage fingers 33, 49 will be machined to measure only one size of a fastener 55, shown to be a conventional hex nut. The cone 37 and vee 53 will measure pitch diameter. The threads 35, 51 will measure functional diameter. A meter 59 indicates in a conventional manner the two different diameters measured.

To perform the measurement, the operator will first calibrate the meter 59 by inserting a master calibration ring (not shown) over the gage fingers 33, 49. The calibration ring will be precisely machined to the specified size of the fastener 55. He will first pull down on handle 23 to cause the gage fingers 33, 49 to constrict. The operator then places the calibration ring on the gage fingers 33, 49 and allows them to move apart. He may calibrate either with the functional diameter threads 35, 51 or with the cone and vee 37, 53. Once in engagement with the calibration ring, the operator will set the meter 59 to the actual diameter of the calibration ring. He then removes the calibration ring.

The operator will then pull down on handle 23 to cause the gage fingers 33, 49 to constrict. When they constrict, they will be in contact with each other and will present a much smaller diameter, approximately one-half that of the fastener 55. The operator then places the fastener 55 on the gage fingers 33, 49. If he wishes to measure functional diameter first, he will place the fastener 55 over the threads 35, 51. The operator releases the handle 23 to allow the spring (not shown) to force the fingers 33, 49 to an expanded position, such as shown in FIG. 1.

The threads 35, 51 will engage the threads 57. The threads 51 may not precisely align with the threads 35 along the helical path initially. This misalignment is a result of the threads 35, 51 being cut on a shaft of a particular diameter. The movable block 21 allows the effective diameter between the threads 35, 51 to differ from that of the original cylindrical shaft. The difference in diameter when the gage fingers 33, 49 contact the fastener threads 57 will result in a misalignment of the helical path of threads 35, 51.

To accommodate this misalignment, the gage finger 49 is free to float or to move perpendicular to the longitudinal axis of frame 13. This movement along the finger axis allows the threads 35 to mesh fully in the threads 57 as well as the threads 51 to mesh fully in the threads 57. The helical path of the threads 35, 51 will align. The arrow in FIG. 1 indicates the movement allowed of the gage finger 49 relative to the gage finger 33. Once the threads 35, 51 have properly engaged the threads 57, the meter 59 will indicate the actual diameter, based on the preset calibration.

Then, if the operator wishes to measure pitch diameter, he will move the handle 23 downward to again constrict the effective diameter of the gage fingers 33, 49. Without removing the fastener 55, he will place the fastener 55 over the cone and vee 37, 53. He allows the handle 23 to move upward, causing the cone 37 to engage the threads 57 and the vee 53 to engage the threads 57. Again, the gage finger 49 is free to move along the frame axis to assure the proper engagement. A second calibration for the pitch diameter is not necessary. The meter 59 will indicate the pitch diameter.

The maximum allowed amount of travel along the finger axis of gage finger 49 need not be much. Finger axis movement during measurements can be zero to only a few thousandths of an inch. In one embodiment, the maximum amount of travel allowed is .125 inch to assure that it will always be more than adequate.

In the embodiment of FIG. 3, movement of one of the gage fingers perpendicular to the axis of the frame is allowed, but with somewhat different structure. In this embodiment, the mounting block 61 is shown to be a movable mounting block. The gage finger of the stationary mounting block (not shown) will rigidly connect to the stationary mounting block, and the movable plate 39 (FIG. 1) is eliminated.

Mounting block 61 has a cylindrical socket 63 that is press fitted into a hole formed in mounting block 61. Socket 63 is threaded inside for receiving a screw 65.

Screw 65 has an enlarged head 67 that has a diameter greater than socket 63.

Finger bracket 69 has a hole 71 which slidingly receives the socket 63. A pin 73, press fitted into the mounting block 61, inserts through a hole 75 in the finger bracket 69. Finger bracket 69 has an integrally formed gage finger 77, that is identical to either gage finger 33 or gage finger 49.

The thickness from the front side to the back side of the finger bracket 69 is less than the axial distance from the face of mounting block 61 to the end of socket 63. Consequently, when screw 65 is tightened against the socket 63, a clearance 79 will exist. Clearance 79 will be between the front side of finger bracket 69 and the shoulder of the screw head 67 when the finger bracket 69 is pushed into contact with the mounting bracket 61. When the finger bracket 69 is pushed the other way, to the left as shown in the drawing, the clearance 79 will be located between the back side of finger bracket 69 and the face of mounting block 61. During the movement, as indicated in the arrow in FIG. 3, the finger bracket 69 will slide on the socket 63 and on the pin 73. This movement along the finger axis allows the threads of gage finger 77 to mesh properly with the internal threads 57 of a fastener 55 (FIG. 1), as previously discussed.

The invention has significant advantages. The feature allowing one of the gage fingers to move perpendicular to the frame axis allows the threads to properly mesh into the internal threads of the fastener. This ensures a more accurate measurement than in the prior art. Having pitch diameter threads and functional threads allows both measurements to be made with a single instrument. There is no need to exchange gage fingers cut with functional diameter threads for gage fingers cut with cone and vee for pitch diameter measurements. The fastener does not have to be removed from the gage fingers to measure both pitch and functional diameters.

While the invention has been shown in only one of its forms, it should be apparent to those skilled in the art that it is not so limited, but is susceptible to various changes without departing from the scope of the invention. For example, in the alternate embodiment of FIG. 3, the structure shown allowing movement of the finger bracket relative to the movable mounting block could be located on the stationary mounting block instead, in which case the upper gage finger would be rigidly mounted to the movable mounting block.

I claim:

1. An internal thread gage for gaging internal threads of a fastener, comprising in combination:
   a frame with a frame axis;
   a mounting block;
   a pair of gage fingers, each having a partially cylindrical section containing threads;
   first mounting means for mounting one of the gage fingers to the mounting block;
   second mounting means for mounting the other of the gage fingers to the frame, with the gage fingers in juxtaposition with the each other to define a common finger axis between them which is perpendicular to the frame axis;
   means for moving the mounting block in a straight line relative to the frame along the frame axis for positioning the gage fingers in a constricted position to allow a fastener to be inserted over the gage fingers and an expanded position with the threads of each in engagement with the internal threads of the fastener to measure the internal threads of the fastener; and
   one of the mounting means allowing one of the gage fingers to move relative to the frame and to the other gage finger along the finger axis so as to allow helical path alignment of the threads of the gage fingers.

2. The thread gage according to claim 1 wherein said one of the mounting means is the first mounting means.

3. The thread gage according to claim 1 wherein said one of the mounting means is the second mounting means.

4. An internal thread gage for gaging internal threads of a fastener, comprising in combination:
   a frame with a frame axis, the frame having first and second mounting blocks;
   first and second finger brackets;
   a pair of gage fingers, each protruding from one of the finger brackets, each having a partially cylindrical section containing threads;
   first mounting means for mounting the first finger bracket to the first mounting block and for allowing the first finger bracket to slide relative to the frame and perpendicular to the frame axis;
   second mounting means for mounting the second finger bracket to the second mounting block, with the gage fingers in juxtaposition with each other; and
   means for moving one of the mounting blocks relative to the frame along the frame axis for positioning the gage fingers in a constricted position to allow a fastener to be inserted over the gage fingers and an expanded position with the threads of each in engagement with the internal threads of the fastener to measure the internal threads of the fastener.

5. The apparatus according to claim 4 wherein the first mounting means comprises:
   a mounting plate;
   a screw extending through a hole in the first finger bracket and into the mounting plate to rigidly secure the first finger bracket to the first mounting plate; and
   at least two pins extending between the first mounting block and the mounting plate perpendicular to the frame axis, to enable the mounting plate to slide perpendicular to the frame axis.

6. The apparatus according to claim 4 wherein the first mounting means comprises:
   a mounting plate;
   a screw extending through a hole in the first finger bracket and into the mounting plate to rigidly secure the first finger bracket to the mounting plate; and
   at least two pins rigidly secured to the mounting plate and extending slidably through holes provided in the first mounting block, to enable the mounting plate to slide relative to the first mounting block.

7. The apparatus according to claim 4 wherein the first mounting means comprises:
   an internally threaded socket protruding from the first mounting block in a direction perpendicular to the frame axis;
   a hole extending through the first finger bracket, the socket having a greater length than the thickness of the first finger bracket, causing the socket to protrude beyond the first finger bracket;

an externally threaded screW secured to the internally threaded socket, the screw having a head of greater diameter than the socket; and a pin extending between the first mounting block and the first finger bracket, to enable the first finger bracket to slide on the socket.

8. An internal thread gage for gaging internal threads of a fastener, comprising in combination:

a frame with a frame axis, the frame having first and second mounting blocks;

first and second finger brackets;

a pair of gage fingers, each protruding from one of the finger brackets, each having a partially cylindrical section containing threads;

mounting means for mounting the second finger bracket to the second mounting block;

an internally threaded socket protruding from the first mounting block;

the first finger bracket having a hole for slidably receiving the socket, the socket having a greater length than the thickness of the first finger bracket, causing the socket to protrude beyond the first finger bracket;

an externally threaded screw secured to the internally threaded socket, the screw having a head of greater diameter than the socket, the first finger bracket being slidable on the socket between one position contacting the first mounting block and another position contacting the head of the screw; and means for moving one of the mounting blocks relative to the frame along the frame axis for positioning the gage fingers in a constricted position to allow a fastener to be inserted over the gage fingers and in an expanded position with the threads of each in engagement with the internal threads of the fastener to measure the internal threads of the fastener, the slidable movement of the first finger bracket relative to the socket enabling helical alignment of the threads of the gage fingers.

9. The thread gage according to claim 8 further comprising:

a pin extending between the first finger bracket and the first mounting block to maintain alignment as the first finger bracket slides on the socket.

10. The thread gage according to claim 8 further comprising:

a pin rigidly mounted to the first mounting block and extending slidingly through a hole provided in the first finger bracket to maintain alignment as the first finger bracket slides on the socket.

11. In an internal thread gage for gaging internal threads of a fastener, of a type having a frame with a frame axis, a pair of gage fingers carried by the frame in juxtaposition with each other to define a finger axis between them that extends perpendicular to the frame axis, each having a partially cylindrical section containing functional diameter threads, means for moving the gage fingers in a straight line relative to each other along the frame axis between a constricted position to allow a fastener to be inserted over the gage fingers and an expanded position with the functional diameter threads of each in engagement with the internal threads of the fastener to measure functional diameter of the internal threads of the fastener, the improvement comprising in combination:

means for allowing at least one of the gage fingers to move along the finger axis relative to the other of the gage fingers so as to maintain helical path alignment of the functional diameter threads of the gage fingers;

a single protuberance formed on one of the gage fingers a distance from the functional diameter threads on that gage finger and on the same side of the frame as the functional diameter threads, defining a cone; and a pair of protuberances formed on the other of the gage fingers, defining a vee for alignment with the cone to enable measurement of pitch diameter of the internal threads of the fastener.

12. An internal thread gage for gaging internal threads of a fastener, comprising in combination:

a frame with a frame axis;

pair of gage fingers, each having an inner end mounted to the frame in juxtaposition with each other and an outer end protruding from the frame perpendicular to the frame axis;

each of the gage fingers having a partially cylindrical section located intermediate the inner and outer ends and containing functional diameter threads;

means for moving the gage fingers in a straight line relative to each other along the frame axis between a constricted position to allow a fastener to be inserted over the gage fingers and an expanded position with the functional diameter threads of each in engagement with the internal threads of the fastener to measure functional diameter of the internal threads of the fastener;

a single protuberance formed on one of the gage fingers a distance from the functional diameter threads on that gage finger and on the same side of the frame as the functional diameter threads, defining a cone; and a pair of protuberances formed on the other of the gage fingers a distance from and on the same side as the functional diameter threads on that gage finger, defining a vee for alignment with the cone to enable measurement of pitch diameter of the internal threads of the fastener.

* * * * *